(12) United States Patent
Carmeli et al.

(10) Patent No.: US 7,696,880 B2
(45) Date of Patent: *Apr. 13, 2010

(54) HIERARCHICAL TAGGING OF OBJECTS

(75) Inventors: Boaz Carmeli, Koranit (IL); Yossi Mesika, Afula (IL)

(73) Assignee: International Business Machines Corporation, Armonk, NY (US)

(*) Notice: Subject to any disclaimer, the term of this patent is extended or adjusted under 35 U.S.C. 154(b) by 3 days.

This patent is subject to a terminal disclaimer.

(21) Appl. No.: 12/027,282

(22) Filed: Feb. 7, 2008

(65) Prior Publication Data

US 2008/0186141 A1    Aug. 7, 2008

Related U.S. Application Data

(63) Continuation-in-part of application No. 11/672,045, filed on Feb. 7, 2007.

(51) Int. Cl.
  *G08B 13/14* (2006.01)
  *H04Q 5/22* (2006.01)
(52) U.S. Cl. ............... 340/572.1; 340/10.51; 340/10.52
(58) Field of Classification Search .............. 340/10.51, 340/572.1, 10.52
  See application file for complete search history.

(56) References Cited

U.S. PATENT DOCUMENTS

| | | | |
|---|---|---|---|
| 2005/0253687 A1 | 11/2005 | Martinez et al. | |
| 2006/0006987 A1* | 1/2006 | Hashimoto et al. | 340/10.51 |
| 2006/0181420 A1* | 8/2006 | Ishii | 340/572.1 |
| 2006/0212164 A1* | 9/2006 | Abraham et al. | 700/215 |
| 2007/0198582 A1* | 8/2007 | Yamamichi et al. | 707/104.1 |
| 2008/0103622 A1* | 5/2008 | Hanses et al. | 700/116 |

FOREIGN PATENT DOCUMENTS

JP      2006146361 A1    8/2006

\* cited by examiner

*Primary Examiner*—Benjamin C Lee
*Assistant Examiner*—Andrew Bee

(57) ABSTRACT

An RFID tag is provided including an object ID and a counter. Such an RFID tag may be employed in an RFID tag system including a parent RFID tag having an object ID and a counter, a child RFID tag, and a reader/writer configured to read the object ID and the counter of the parent RFID tag, combine values of the object ID and the counter, and write the combined value to an object ID of the child RFID tag.

7 Claims, 5 Drawing Sheets

HIERARCHICAL TAGGING OF OBJECTS

CROSS-REFERENCE TO RELATED APPLICATIONS

This application is a continuation-in-part application of U.S. patent application Ser. No. 11/672,045, filed on Feb. 7, 2007, which is incorporated herein by reference in its entirety.

FIELD OF THE INVENTION

The present invention relates to object tagging in general, and in particular to tag identification management.

BACKGROUND OF THE INVENTION

Identification tags, such as Radio Frequency Identification (RFID) tags, printed labels displaying a visual code such as a bar code or a Quick Response (QR) code, and the like, are typically attached to objects for information and/or tracking purposes, where information may be written to a tag and later read by an external reader. Information stored on a tag may include an object identifier (ID) that distinguishes the object from other objects. For example, a medical laboratory may attach tags to vials containing patient blood samples, where each tag includes a unique object ID identifying the vial to which it is attached, which object ID may then be recorded and mapped to the patient from whom the sample was taken.

While tags may be used to provide information about individual objects, it may be desirable to associate objects with other objects. For example, where a patient blood sample in one "parent" vial is divided into several other "child" vials, each destined for a different type of analysis, the object ID of each child vial's tag may be recorded in a database together with the object ID of the parent vial's tag. However, where the contents of child vials are further distributed to several other "grandchild" vials, or when vials are sent outside of an organization, managing the hierarchy of object relationships using object IDs of otherwise unrelated tags may become cumbersome.

SUMMARY OF THE INVENTION

The present invention in embodiments thereof discloses a tag architecture and methods for managing tag object IDs that are particularly useful for expressing parent-child object relationships among tags.

There is thus provided in accordance with one aspect of the present invention a tag system including a parent tag having an object ID and a counter, and a reader/writer configured to read the object ID and the counter of the parent tag, combine values of the object ID and the counter, and write the combined value to an object ID of a child tag.

In another aspect of the present invention the reader/writer is configured to read a value of the counter, change the read value, and create a new parent tag having the object ID and the changed value.

In another aspect of the present invention the parent tag includes a visual representation of the object ID and counter.

In another aspect of the present invention the a visual representation is a QR code.

In another aspect of the present invention a method is provided for managing tags, the method including configuring a tag with an object ID, and configuring the tag with a counter.

In another aspect of the present invention a method is provided for managing tags, the method including reading values of an object ID and a counter of a parent tag, combining the values, and writing the combined value to an object ID of a child tag.

In another aspect of the present invention the method further includes changing the read value of the counter, and creating a new parent tag having the object ID and the changed value.

In another aspect of the present invention the method further includes reading values of the object ID and a counter of the child tag, combining the values, and writing the combined value to an object ID of a grandchild tag.

It is appreciated that the term "tag" as it is used throughout the specification and claims refers to any type of mechanism capable of bearing an identification, such as, but not limited to, an RFID tag or a printed label.

It is further appreciated that references throughout the specification and claims to "writing" information to a tag refer to storing information to magnetic or optical data storage on a tag, such as in the case of an RFID tag, or to printing information onto a tag, such as in the case of a printed label on which the information is visually represented.

BRIEF DESCRIPTION OF THE DRAWINGS

Embodiments of the present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
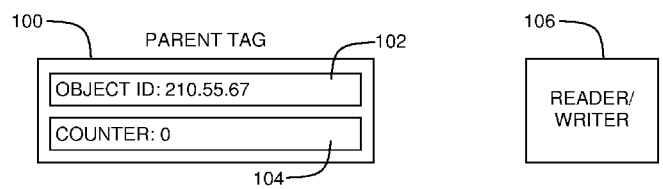
FIGS. 1A-1H are simplified conceptual illustrations of a hierarchical tag system, constructed and operative in accordance with an embodiment of the present invention.
Figure 1B:
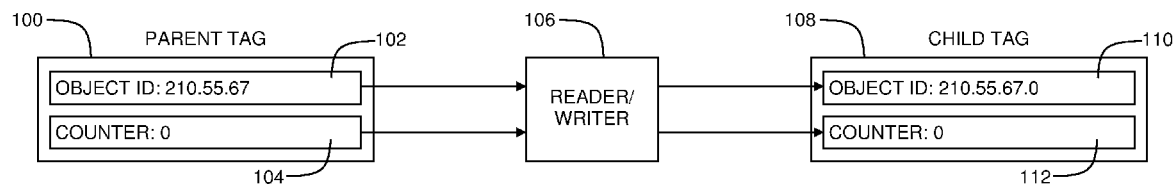
Figure 1C:
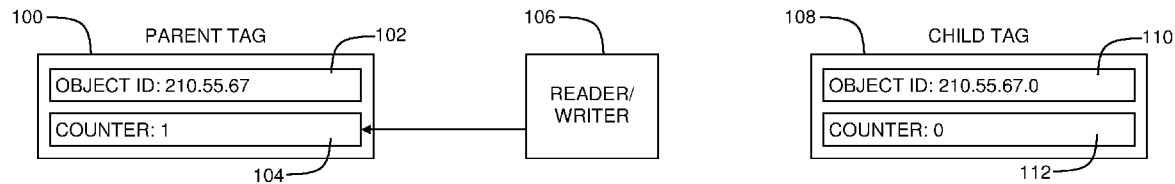
Figure 1D:
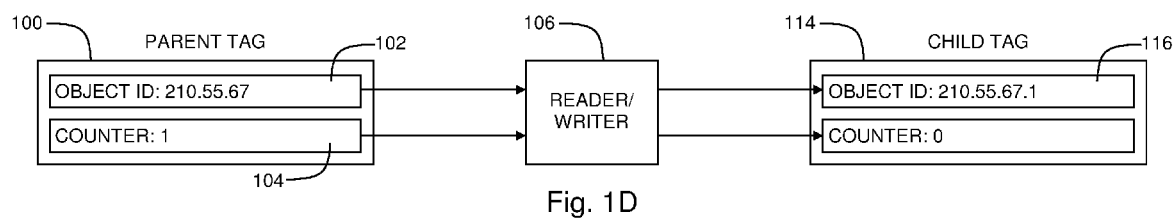
Figure 1E:
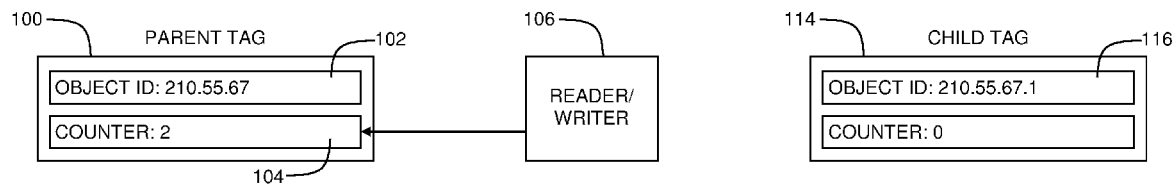
Figure 1F:
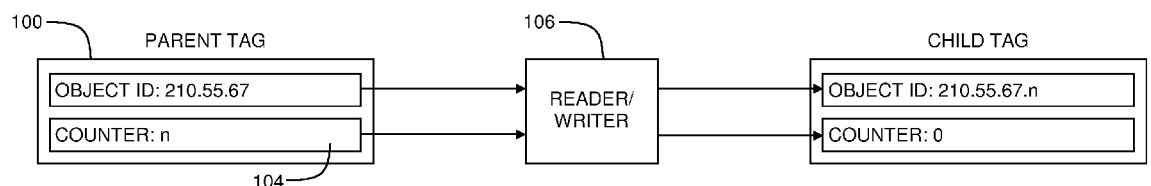
Figure 1G:
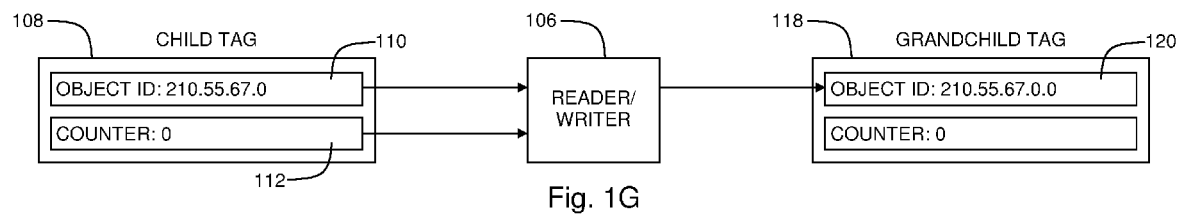
Figure 1H:
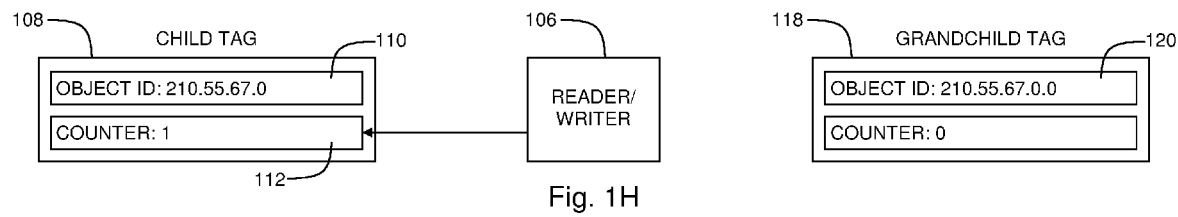
Figure 2:
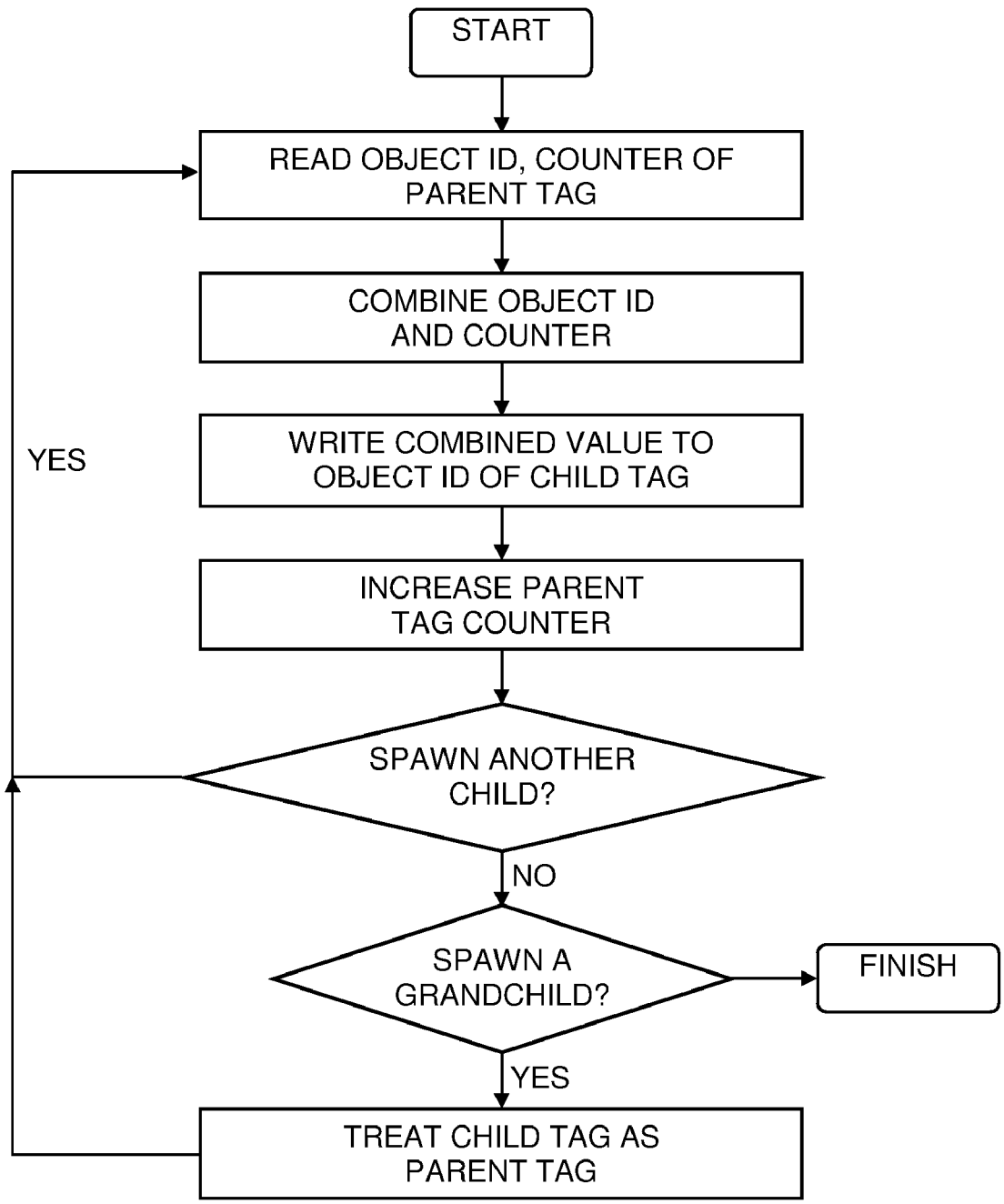
FIG. 2 is a simplified flowchart illustration of an exemplary method of operation of the hierarchical tag system of FIGS. 1A-1H, operative in accordance with an embodiment of the present invention.

Reference is now made to FIGS. 1A-1H, which are simplified conceptual illustrations of a hierarchical tag system, constructed and operative in accordance with an embodiment of the present invention, and additionally to FIG. 2, which is a simplified flowchart illustration of an exemplary method of operation of the hierarchical tag system of FIGS. 1A, 1B, and 1C, operative in accordance with an embodiment of the present invention. In FIG. 1A a tag 100, such as an RFID tag, is configured with an object ID 102 and a counter 104, both of which may be initialized to initial values, such as a unique ID for object ID 102 and 0 for counter 104. A reader/writer 106 is shown that is capable of reading tag 100 in accordance with conventional techniques. In addition to reading tag 100 to obtain object ID 102, reader/writer 106 is also able to read counter 104.

In accordance with the present invention, tag 100 may be used as a "parent" tag by reader/writer 106 to spawn a "child" tag 108, as is shown in FIG. 1B, by combining the values of object ID 102 and counter 104 of parent tag 100, such as by appending a separator and the value of counter 104 to the end of the value of object ID, and then writing the combined result to an object ID 110 of child tag 108. Thus, in the example shown, a period separator and the counter value 0 of counter 104 are appended by reader/writer 106 to the object ID value 210.55.67 of object ID 102, resulting in the value 210.55.67.0, which reader/writer 106 writes to object ID 110 of child tag 108.

After parent tag 100 is used to spawn child tag 108, its counter is preferably changed by reader/writer 106, such as by adding 1 to the current value of counter 104 and writing the new value to counter 104. Thus, counter 104 changes from a value of 0 to a value of 1 as is shown in FIG. 1C. In this way parent tag 100 may be used to spawn additional child tags, each having a unique object ID. Thus, in FIG. 1D reader/writer 106 uses parent tag 100 to spawn another child tag 114, whose object ID 116 is initialized with the value 210.55.67.1, thus distinguishing it from the object ID of child tag 108. Reader/writer 106 then increments counter 104 of parent tag 100 as is shown in FIG. 1E. Parent tag 100 may be used by reader/writer 106 to spawn additional child tags, such as to a maximum of n child tags as shown in FIG. 1F, where n may be set to a predefined value or may represent a maximum value of a tag counter as limited by the number of digits the counter may hold.

Referring again to FIG. 1B and additionally to FIG. 1G, child tag 108 may be configured with a counter 112 that reader/writer 106 may initialize to an initial value, such as 0, when object ID 110 is first populated. Thus, child tag 108 may itself become a parent tag and spawn child tags that are "grandchildren" of tag 100. In this manner, further generations of child tags may be spawned, with each child generation becoming a parent generation for its children, and so on. Thus, for example, in FIG. 1G child tag 108 is used by reader/writer 106 to spawn a grandchild tag 118, where a period separator and the counter value 0 of counter 112 are appended by reader/writer 106 to the object ID value 210.55.67.0 of object ID 110, resulting in the value 210.55.67.0.0, which reader/writer 106 writes to an object ID 120 of grandchild tag 118. Reader/writer 106 then increments counter 112 of child tag 108 as is shown in FIG. 1H.

Figure 3A:
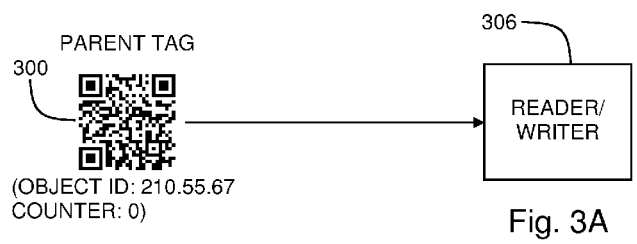
FIGS. 3A-3C are simplified conceptual illustrations of a hierarchical tag system, constructed and operative in accordance with an embodiment of the present invention.
Figure 3B:
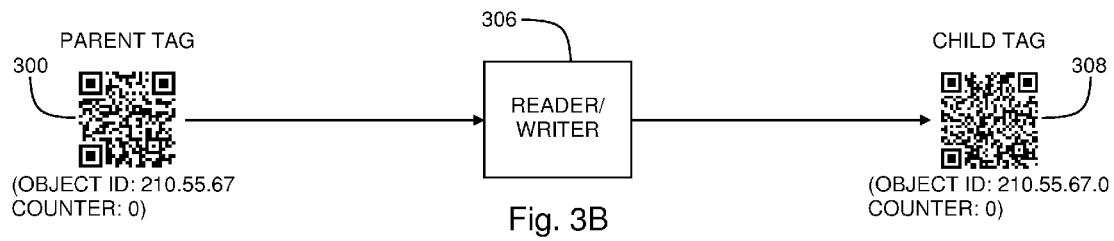
Figure 3C:
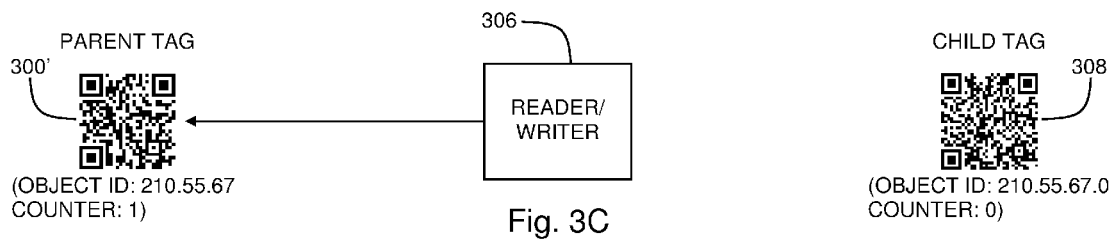

Reference is now made to FIGS. 3A-3C, which are simplified conceptual illustrations of a hierarchical tag system, constructed and operative in accordance with an embodiment of the present invention. The system of FIGS. 3A-3C is substantially similar to the system of FIGS. 1A-1C, with the notable exception that the tags in FIGS. 3A-3C are printed labels bearing a visual representation of an object ID and a counter, such as in the form of a QR code or a bar code. Thus, in FIG. 3A a parent tag 300 is printed with a QR code into which an object ID and a counter are encoded. In FIG. 3B a reader/writer 306 reads the object ID and counter encoded on parent tag 300 and spawns a child tag 308 into which an object ID and a counter are encoded, the object ID formed by combining the values of the object ID and counter of parent tag 300. In FIG. 3C reader/writer 306 prints a new parent tag 300' with a QR code into which the object ID of parent tag 300 and an incremented counter of parent tag 300 are encoded.

It will be appreciated that the present invention is useful where it is desirable to associate objects with other objects. Thus, in the example above, where a patient blood sample in one parent vial is divided into several other child vials, each destined for a different type of analysis, the relationships among the vials may be expressed by their tags by tagging the parent and child vials with the tags of the present invention, where the object ID and counter of the parent vial's tag is combined to form the object ID of each child vial's tag.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A tag system for creating one or more child tag object IDs from a parent tag, comprising:
    said parent tag having an object ID, and a counter for generating a value corresponding to the number sequence of said one or more child tag object IDs to be created; and
    a reader/writer configured to
    read said object ID and said counter of said parent tag,
    combine values of said object ID and said counter of said parent tag by appending the value of said counter to an end of the value of said object ID of said parent tag into a combined value, and
    write said combined value as the object ID to a child tag.

2. A tag system according to claim 1 wherein said reader/writer is configured to read a value of said counter of said parent tag, change said read value, and create a new parent tag having said object ID of said parent tag and said changed value.

3. A tag system according to claim 1 wherein said parent tag includes a visual representation of said object ID and said counter of said parent tag.

4. A tag system according to claim 3 wherein said a visual representation is a QR code.

5. A method for managing tags, including creating one or more child tag object IDs from a parent tag, the method comprising:
    providing a parent tag having an object ID, and a counter for generating a value corresponding to the number sequence of said one or more child tag object IDs to be created;
    reading values of said object ID and said counter of said parent tag;
    combining said values by appending the value of said counter to an end of the value of said object ID of said parent tag into a combined value; and
    writing said combined value as the object ID to a child tag.

6. A method according to claim 5 and further comprising: changing said read value of said counter of said parent tag; and creating a new parent tag having said object ID of said parent tag and said changed value.

7. A method according to claim 5 and further comprising:
    reading values of said object ID of said child tag and a counter of said child tag;
    combining the values by appending the value of said child tag counter to an end of the value of said child tag object ID; and
    writing said combined child tag object ID and counter value as the object ID to a grandchild tag.

* * * * *